United States Patent [19]

Douglas et al.

[11] Patent Number: 4,599,223
[45] Date of Patent: Jul. 8, 1986

[54] SEPARATION OF TUNGSTEN FROM RHENIUM

[75] Inventors: Alan D. Douglas; Kenneth T. Reilly; Martin B. MacInnis, all of Towanda; John A. Powers, New Albany; James N. Christini, Towanda, all of Pa.

[73] Assignee: GTE Products Corporation, Stamford, Conn.

[21] Appl. No.: 737,758

[22] Filed: May 28, 1985

[51] Int. Cl.$^4$ .................. C01G 41/00; C01G 47/00
[52] U.S. Cl. .......................... 423/49; 423/50; 423/51; 423/52; 423/55
[58] Field of Search .............. 423/50, 49, 51, 52, 423/55

[56] References Cited

U.S. PATENT DOCUMENTS

| | | | |
|---|---|---|---|
| 3,733,388 | 5/1973 | Ziegler et al. | 423/49 |
| 4,278,641 | 7/1981 | Petrov et al. | 423/49 |
| 4,521,381 | 6/1985 | Douglas et al. | 423/49 |

OTHER PUBLICATIONS

Lazarev, "Nuclear Science Absts.", vol. 14, #19, Oct. 15, 1960, #19043.

*Primary Examiner*—H. T. Carter
*Attorney, Agent, or Firm*—Donald R. Castle; L. Rita Quatrini

[57] ABSTRACT

A process is disclosed for separating tungsten from a solution containing tungstate and perrhenate ions. The process involves reacting a sufficient amount of hydrochloric acid with the solution at a sufficient temperature to form a solid containing essentially all of the tungsten and a liquor containing essentially all of the rhenium, and separating the solid from the liquor.

5 Claims, No Drawings

SEPARATION OF TUNGSTEN FROM RHENIUM

BACKGROUND OF THE INVENTION

This invention relates to a process for separating tungsten from a solution containing tungstate and perrhenate ions.

In the reclamation of tungsten and rhenium values from material such as alloy scrap, separation of these values is necessary to permit preparation of relatively pure tungsten and relatively pure rhenium products.

This separation has been done by passing an alkaline solution of the tungsten and rhenium values through a strongly basic anion exchange resin so that the rhenium is preferentially absorbed and the tungsten is not. Disadvantages of the ion exchange method include difficulty of stripping rhenium from the resin, the inefficiency of separation should a high concentration of certain ions such as chloride be present, and the necessity of having large scale specialized equipment available.

A process for separating tungsten from rhenium without the above disadvantages would be an advancement in the art.

SUMMARY OF THE INVENTION

In accordance with one aspect of this invention, there is provided a process for separating tungsten from a solution containing tungstate and perrhenate ions. The process involves reacting a sufficient amount of hydrochloric acid with the solution at a sufficient temperature to form a solid containing essentially all of the tungsten and a liquor containing essentially all of the rhenium and separating the solid from the liquor.

DETAILED DESCRIPTION OF THE INVENTION

For a better understanding of the present invention, together with other and further objects, advantages, and capabilities thereof, reference is made to the following disclosure and appended claims in connection with the above description of some of the aspects of the invention.

The starting solution of this invention can be essentially any solution containing tungstate and perrhenate ions, but is preferably an alkali metal tungstate-perrhenate solution. Most preferably, the solution is sodiun tungstate-sodium perrhenate which is typically derived from an oxidizing fusion of tungsten-rhenium alloy material such as scrap material with sodium hydroxide followed by dissolution of the resulting fusion material in water, preferably hot water to give a solution having a specific gravity at room temperature of about 1.350. After all of the soluble constituents have dissolved, the solution is filtered to remove insolubles such as impurities and unreacted alloy material from the fusion operation.

The solution concentration can vary, with the limitations being the solubility of the particular tungstate and perrhenate species. However, the solution concentration is typically from about 90 to about 150 grams of W per liter and from about 3 to about 5 grams of Re per liter.

The starting solution containing the tungstate and perrhenate ions is reacted with a sufficient amount of hydrochloric acid at a sufficient temperature to form a solid containing essentially all of the tungsten, essentially as tungstic acid, and a liquor containing essentially all of the rhenium.

The amount of hydrochloric acid must be sufficient so that the resulting liquor is at least about 1.25 normal in hydrochloric acid. This is the criterion used to insure that the tungsten is completely precipitated as the tungstic acid solid. The actual amount of hydrochloric acid depends on the concentration of tungsten and on the degree of alkalinity of the solution. Generally the hydrochloric acid can be added in any relatively concentrated form with from about 10 normal to about 12 normal being preferred. Preferably this concentrated hydrochloric acid is diluted with water to give a concentration of at least about 50% by volume of the concentrated hydrochloric acid in water. Relative amounts of hydrochloric acid, water, and solution which are actually used will become apparent in the example that follows.

The temperature must be at least about 85° C., and preferably from about 85° C. to about 100° C. to insure that the solid tungstic acid is of a sufficiently large particle size so that it can be subsequently separated from the rhenium containing liquor without occluding significant amounts of the liquor. At lower temperatures the solid is colloidal which makes physical separation from the liquor extremely difficult.

In actual practice, typically hot water and the concentrated hydrochloric acid are charged to a tank and heated to about 88° C. The solution which has been heated to about 88° C. is then added. The precipitation of tungstic acid to form the solid begins immediately. However, typically the resulting acid-tungsten-rhenium mixture is allowed to digest in the temperature range of from about 85° C. to about 100° C. with agitation for from about 30 minutes to about 60 minutes to insure complete precipitation of the tungsten as the solid tungstic acid.

The solid is then separated from the liquor by any conventional method such as by allowing the solid to settle followed by decanting the liquor, or by filtration preferably with a filter press. When a filter press is used, the soluble salts such as perrhenic acid are washed from the solid in the press with a relatively small amount of water which can be combined with the liquor to give a single rhenium bearing solution containing a very small amount of tungsten.

The solid can be water washed by any standard method until essentially all of the rhenium is removed therefrom.

The solid, now a relatively pure tungsten compound which is essentially tungstic acid can now be further processed by standard methods to produce other tungsten compounds or tungsten metal.

By the process of this invention, at least about 99.5% by weight of the tungsten in the starting solution is recovered as tungstic acid in the solid which is essentially free of rhenium. At least about 95% by weight of the rhenium in the starting solution is generally recovered in the liquor for further processing.

Rhenium can now be recovered from the liquor (or the liquor in combination with wash liquors from the washing of the solid) by any one of several known techniques.

One method is to evaporate the liquor in a steam jacketed vessel to induce crystallization of sodium chloride. The sodium chloride crystals are then separated from the rhenium bearing solution by any convenient method such as filtration, centrifugation, etc. Evaporation and crystallization is then continued in a similar fashion until the rhenium concentration in the remaining mother liquor is high enough to be in danger of crystallizing sodium perrhenate, or to increase the viscosity so that sodium chloride crystal separation becomes inefficient. At this point the solution is diluted with water, and ammonium hydroxide is added to form ammonium perrhenate. This compound can be crystallized by cooling, filtration, washing, etc. It can also be recrystallized in pure water to reduce impurity content, and can be hydrogen reduced to provide a pure rhenium powder.

Another possible method of recovering rhenium from the liquor is as perrhenate ion on a strongly basic anion exchange resin.

Another method, and the currently preferred method is to precipitate rhenium as rhenium heptasulfide from the liquor using any convenient source of sulfide ion such as hydrogen sulfide, sodium sulfide, sodium sulfhydrate, ammonium sulfide, sodium thiosulfate, etc. The precipitated rhenium heptasulfide is then filtered from the solution, water washed, and dried. Rhenium can then be obtained from the heptasulfide by any one of a variety of techniques, such as direct hydrogen reduction, thermal decomposition in an inert atmosphere, or by oxidation to rhenium heptoxide by oxygen, or to perrhenate ion by wet chemical oxidizers, followed by hydrogen reduction to rhenium.

To more fully illustrate this invention, the following non-limiting example is presented. All parts, portions, and percentages are on a weight basis unless otherwise stated.

EXAMPLE

To a solution containing about 216 parts of sodium tungstate dihydrate and about 5.5 parts of sodium perrhenate at a pH of about 13.9 is added about 288 parts of concentrated hydrochloric acid to neutralize the contained sodium hydroxide and adjust the pH to about 9.35. The resulting pH adjusted solution is then filtered to remove any insolubles and heated to about 90° C. The hot solution is added slowly to about 408 parts of concentrated hydrochloric acid with agitation over a period of about 4 minutes. Tungstic acid precipitates immediately and the resulting mixture is digested for about 1 hour with agitation at a temperature of from about 88° C. to about 92° C. The resulting digested mixture is allowed to settle for about 1 hour and is then filtered. The resulting tungstic acid solid is then water washed to remove any entrained liquor. The solid contains about 99.5% by weight of the starting tungsten. The rhenium content of the solid is about 0.10%. About 95% by weight of the starting rhenium is recovered in the liquor and washes.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for separating tungsten from a solution containing tungstate and perrhenate ions, said process comprising:
    (a) reacting hydrochloric acid with said solution at a temperature of at least about 85° C. to form a solid containing essentially all of the tungsten, the amount of said hydrochloric acid being sufficient to enable said liquor to be at least about 1.25 normal in hydrochloric acid after said solid has formed; and
    (b) separating said solid from said liquor.

2. A process according to claim 1 wherein said solution is an alkali metal tungstate and perrhenate solution.

3. A process according to claim 2 wherein said alkali metal tungstate and perrhenate solution is a sodium tungstate-sodium perrhenate solution.

4. A process according to claim 1 wherein said solution and said hydrochloric acid are reacted at a temperature of from about 85° C. to about 100° C.

5. A process according to claim 1 wherein at least about 99.5% by weight of the tungsten in said solution is recovered in said solid and at least about 95% by weight of the rhenium in said solution is in said liquor.

* * * * *